US009982990B2

(12) United States Patent
Rubio Aguilera et al.

(10) Patent No.: US 9,982,990 B2
(45) Date of Patent: May 29, 2018

(54) SYRINGE NEEDLE POSITION AND DEVIATION CORRECTION METHOD IN A MACHINE FOR THE AUTOMATIC PREPARATION OF INTRAVENOUS MEDICATION

(71) Applicant: GRIFOLS ENGINEERING, S.A., Parets del Valles (Barcelona) (ES)

(72) Inventors: Javier Rubio Aguilera, Mollet del Valles (ES); Oriol Casanova Montpeyo, Canovelles (ES)

(73) Assignee: GRIFOLS ENGINEERING, S.A., Parets del Valles (Barcelona) (ES)

( * ) Notice: Subject to any disclaimer, the term of this patent is extended or adjusted under 35 U.S.C. 154(b) by 23 days.

(21) Appl. No.: 15/342,939

(22) Filed: Nov. 3, 2016

(65) Prior Publication Data
US 2017/0158360 A1  Jun. 8, 2017

(30) Foreign Application Priority Data

Dec. 4, 2015  (ES) .................................. 201531768

(51) Int. Cl.
*G01B 11/00* (2006.01)
*B25J 9/16* (2006.01)
(Continued)

(52) U.S. Cl.
CPC .............. *G01B 11/002* (2013.01); *A61J 1/20* (2013.01); *B25J 9/1694* (2013.01);
(Continued)

(58) Field of Classification Search
CPC ...... B25J 9/1694; G01B 11/03; G01B 11/002; G01B 11/2433; G01B 11/272; B65B 3/003
(Continued)

(56) References Cited

U.S. PATENT DOCUMENTS

| 4,495,149 A | 1/1985 | Iwata et al. |
| 4,518,855 A | 5/1985 | Malak |

(Continued)

FOREIGN PATENT DOCUMENTS

| CN | 103791852 | 5/2014 |
| CN | 104161546 | 11/2014 |

(Continued)

OTHER PUBLICATIONS

Spanish Search Report dated May 23, 2016 in Spanish Patent Application No. P201531768 filed Dec. 4, 2015 (in Spanish).
(Continued)

*Primary Examiner* — Timothy L Maust
(74) *Attorney, Agent, or Firm* — Knobbe, Martens, Olson & Bear, LLP

(57) ABSTRACT

A method corrects the position and deviation of a syringe needle in a machine for automatically preparing intravenous medication. The machine includes an automatic actuator, together with a control system, in which are placed the syringe and a one-dimensional position sensor including a measuring plane. The correction method includes steps in which the position sensor obtains position coordinates of a first and a second point of the needle, and steps of correcting the position and deviation error of the needle, by the control system of the automatic actuator.

11 Claims, 10 Drawing Sheets

(51) Int. Cl.
*G01B 11/27* (2006.01)
*G01B 11/24* (2006.01)
*A61J 1/20* (2006.01)
*B65B 3/00* (2006.01)
*B67D 7/32* (2010.01)

(52) U.S. Cl.
CPC ........ *G01B 11/2433* (2013.01); *G01B 11/272* (2013.01); *A61J 1/2096* (2013.01); *B65B 3/003* (2013.01); *B65B 3/006* (2013.01); *B67D 7/32* (2013.01)

(58) Field of Classification Search
USPC .................. 141/319, 329; 422/400; 345/158; 382/103
See application file for complete search history.

(56) References Cited

U.S. PATENT DOCUMENTS

| | | | | |
|---|---|---|---|---|
| 6,024,576 | A * | 2/2000 | Bevirt | G05G 9/04 345/158 |
| 8,386,070 | B2 * | 2/2013 | Eliuk | A61J 1/20 141/1 |
| 9,033,006 | B2 * | 5/2015 | Perazzo | A61J 7/0053 141/319 |
| 9,114,252 | B2 * | 8/2015 | Yu | A61N 5/1027 |
| 9,466,088 | B2 * | 10/2016 | Perazzo | B65B 57/02 |
| 2010/0021348 | A1 * | 1/2010 | Baldassari | G06T 1/0014 422/400 |
| 2015/0335531 | A1 * | 11/2015 | Yuyama | A61J 1/20 141/18 |
| 2017/0121046 | A1 * | 5/2017 | Diaz | B65B 7/2821 |

FOREIGN PATENT DOCUMENTS

| | | |
|---|---|---|
| GB | 2 291 967 A | 2/1996 |
| GB | 2291967 | 2/1996 |

OTHER PUBLICATIONS

European Search Report, dated Mar. 28, 2017, in European Patent Application No. 16382478.2.

* cited by examiner

SYRINGE NEEDLE POSITION AND DEVIATION CORRECTION METHOD IN A MACHINE FOR THE AUTOMATIC PREPARATION OF INTRAVENOUS MEDICATION

CROSS REFERENCE TO RELATED APPLICATIONS

This application claims the benefit of priority of the Spanish Patent Application No. P201531768, filed Dec. 4, 2015, which is hereby incorporated by reference in its entirety.

BACKGROUND

The present invention relates to the sector of machines for automatically preparing intravenous medication used preferably for cytostatic, cytotoxic and/or analgesic treatments, among others.

SUMMARY

In particular, the present invention relates to a method for said type of machines for automatically preparing intravenous medication, comprising at least one actuator capable of preparing at least one mixture of medication for intravenous administration, automatically and without manual intervention by the user. With said type of machines it is possible, through actuation by at least one actuator (which may, for example, be mechanical, electromechanical or robotic, among other types) to prepare specific medication produced by mixing various base intravenous administration components, such as a type of drug and a type of solvent, among others.

BRIEF DESCRIPTION OF THE DRAWINGS

For a better understanding, some drawings of an embodiment according to the present invention are attached by way of explanatory but non-limiting example.

DETAILED DESCRIPTION

Figure 1:
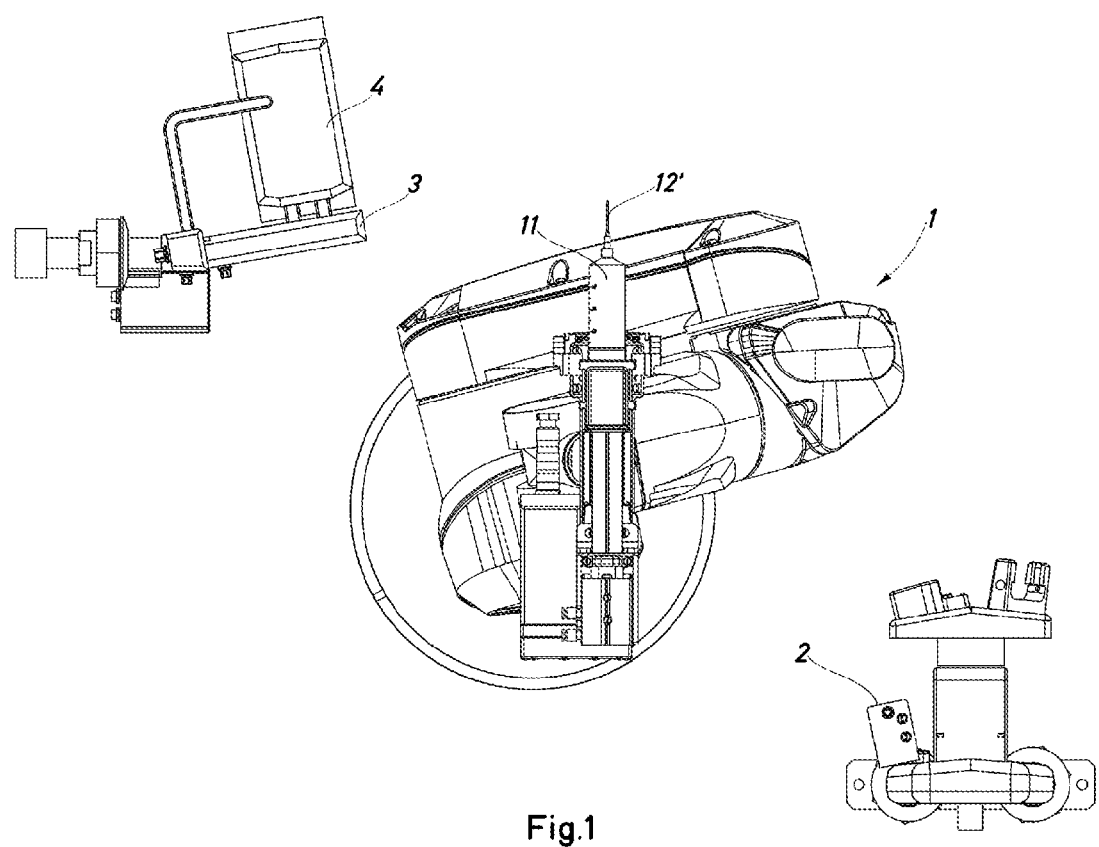
FIG. 1 is a perspective view of the interior of the enclosed space of an embodiment of a machine for automatically preparing medication, illustrating a robotic arm, a shutter port and a laser position sensor.

In the present invention, the terms intravenous administration component or base component mean any medicinal product, substance or drug for intravenous administration to patients, as well as any necessary solvent used for mixing with at least one medicinal product, substance or drug for intravenous administration.

The base components used for producing said medication mixtures are originally stored in specific bags or containers, which are usually positioned in a specific area inside the machine. Using a syringe supported and actuated by the actuator of said machine, the volume of base component required for the desired medication mixture is drawn out and transferred to a suitable store for storing the mixture of said base component with other base components previously deposited for the same medication mixture.

The actuator of the machine is responsible for moving the syringe towards the specific bags or containers so that the needle pierces them. The dimensions of the puncture surfaces of the bags or containers are small, and therefore the task of inserting the needle is tricky, requiring great precision with little margin for error.

Furthermore, owing to the noxious nature of the base components handled by this type of machines for automatically preparing medicinal products, the automatic process for preparing medicinal products takes place in an enclosed space to which access by a user is not permitted while the actuator is working. The tendency is for these automatic machines to be increasingly compact, for convenience of installation and use, such that the space for the machine is the smallest required by the actuator in order to perform its movements without collision.

Despite the precision of actuators of machines for automatically preparing medicinal products, existing syringes vary greatly in terms of both the position of the needle and its deviation, occasionally preventing the needle from being correctly inserted into the bag or container. In such situations it is necessary to change the orientation of the syringe so that the needle can be correctly inserted into the bag or container. Owing to the small margin of error when puncturing the bag or container, changing the orientation of the syringe requires knowing the exact position of the tip of the needle and its deviation, which requires additional measuring devices that are costly and bulky, thus hampering the movement of the actuator. Furthermore, carrying out measurements with known methods involves a loss of time that has a negative impact on the speed of the process of preparing medicinal products by the machine.

In the present application, needle deviation relates to the angle formed by the needle to the longitudinal axis of the syringe. If the needle is not perfectly aligned with the longitudinal axis of the syringe, there is needle deviation.

An example of a measurement method allowing the deviation of a syringe needle to be detected can be found in British patent document GB2291967A, which discloses an optical device that determines the position of a needle on which laser beams fall. The device comprises a laser source that generates a beam that passes through, first, a rotating refractor and then a beam splitter that splits the laser beam into two different beams. Each of the split beams reflects off mirrors positioned such that the two beams intersect at right angles in the measuring zone, where the needle is introduced until it is exposed to the beams. The shadows created by the needle when it interferes with the two perpendicular laser beams pass through ball lenses and are projected onto photodiodes, such that the device uses the shadow cast by each beam to determine the position of the needle. This is a device that comprises multiple elements interacting with each other in a complicated manner, including even the rotation of one of the sensor elements, meaning that this is a costly and complicated device that requires space for its multiple components. Moreover, the device only indicates whether there is needle deviation and does not correct it.

On the other hand, Chinese patent document CN103584885A discloses a needle calibration method that consists in manually supporting a positioning and navigation needle that is inserted repeatedly into an ultrasonic scanning plane, to obtain a sequence of images containing information on the luminance of the needle. Using the points of greatest luminance, a transformation matrix is calculated, for calibrating the coordinates of the tip of the needle. This method is not applicable to a machine for automatically preparing medicinal products since it involves handling by a user. Furthermore, the method requires the creation of a time sequence of images involving a measuring time that has a negative impact on the speed of the process that the needle has to perform after calibration.

The object of the present invention is to solve the above-mentioned problems of known methods for detecting the position and deviation of a needle.

In particular, the present invention discloses a method for correcting the position and deviation of a syringe needle in a machine for automatically preparing intravenous medication, comprising an automatic actuator, together with a control system, in which are placed the syringe and a one-dimensional position sensor comprising a measuring plane, the correction method comprising the following steps:
  positioning the syringe, by the automatic actuator, in a first measuring position in which a first point of the needle, preferably the tip, interferes with the measuring plane of the position sensor,
  obtaining, by the position sensor, a first position coordinate of the first point of the needle,
  positioning the syringe, by the automatic actuator, in a second measuring position in which a second point of the needle, located a predetermined distance away from the first point, interferes with the measuring plane of the position sensor,
  obtaining, by the position sensor, a first position coordinate of the second point of the needle,
  rotating the syringe, by the automatic actuator, by 90° about the longitudinal axis thereof,
  positioning the 90° rotated syringe, by the automatic actuator, in a third measuring position in which the first point of the needle interferes with the measuring plane of the position sensor,
  obtaining, by the position sensor, a second position coordinate of the first point of the needle,
  positioning the 90° rotated syringe, by the automatic actuator, in a fourth measuring position in which the second point of the needle interferes with the measuring plane of the position sensor,
  obtaining, by the position sensor, a second position coordinate of the second point of the needle,
  moving the position sensor away, by the automatic actuator,
  determining, by the control system of the automatic actuator, the position and deviation error of the needle relative to a reference needle using the position coordinates obtained in the previous phases,
  correcting the position and deviation error of the needle, by the control system of the automatic actuator.

The movements of the automatic actuator allow position coordinates on two axes to be obtained using a one-dimensional position sensor. In other words, the position sensor does not have to be very complex in order to perform the necessary functions in the method that is the subject matter of the present invention. This allows the position sensor to be economical and small, since it can be placed inside a machine for automatically preparing intravenous medication without hampering the room for manoeuvre of the automatic actuator.

The method that is the subject matter of the present invention allows the normal operations of an automatic machine for automatically preparing medication to be performed irrespectively of the deviation of the syringe needles used. The variability present in current syringes is thereby eliminated.

In the first and third measuring position, the point of the needle that interferes with the measuring plane is preferably the tip of the needle. Owing to the variability of the syringe deviations, however, it is possible for the point of the needle that interferes with the measuring plane not to be exactly the tip of the needle, but a point in its immediate vicinity. This fact has no effect on the method that is the subject matter of the present invention.

Preferably, the automatic actuator is displaced linearly by a predetermined distance, preferably 13 mm, in a direction parallel to the longitudinal axis of the syringe, to move from the first measuring position to the second measuring position.

Advantageously, the automatic actuator is displaced linearly by a predetermined distance, preferably 13 mm, in a direction parallel to the longitudinal axis of the syringe, to move from the third measuring position to the fourth measuring position.

Optionally, the 90° rotation about the longitudinal axis of the syringe is clockwise.

Preferably, after each step in which the position sensor obtains position coordinates, the following steps are carried out:
  determining, by the control system of the automatic actuator, the position or deviation error of the needle relative to a reference needle using the position coordinates obtained in the previous phases,
  correcting the position or deviation error of the needle, by the control system of the automatic actuator.

Advantageously, after the step in which the control system of the automatic actuator determines the position and deviation error of the needle relative to a reference needle, the following steps are carried out:
  comparing the predetermined error with a set limit, by the control system of the automatic actuator,
  in the event that the error exceeds the set limit, omitting the error correction and emitting a signal indicating that fact.

Optionally, the automatic actuator is a robotic arm.

Optionally too, the one-dimensional position sensor is a laser position sensor.

FIG. 1 shows, in simplified form, the enclosed space of an embodiment of a machine for automatically preparing medicinal products, i.e. the space in which the actuator carries out the preparation process. The embodiment shown in the figures comprises a robotic arm -1- having its corresponding control system, a laser position sensor -2- as a measuring system and a shutter port -3- giving access to a container -4- in which a base component is located.

Figure 2:
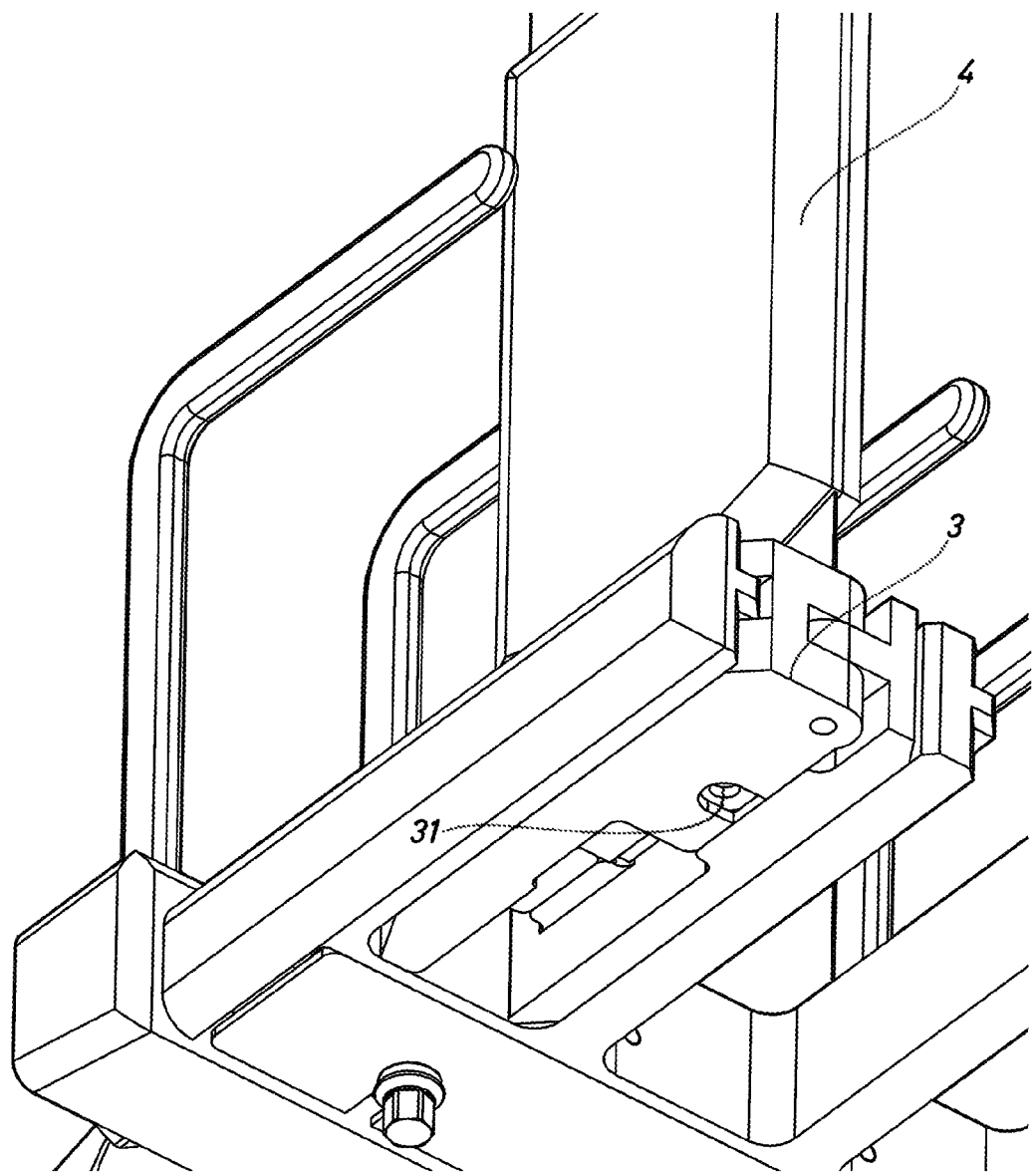
FIG. 2 is a perspective view of the shutter port.

As can be seen in FIG. 2, the shutter port -3- is a structure on which the container -4- is positioned and which comprises a hole -31- allowing a syringe needle to access the contents of the container -4-.

Figure 3:
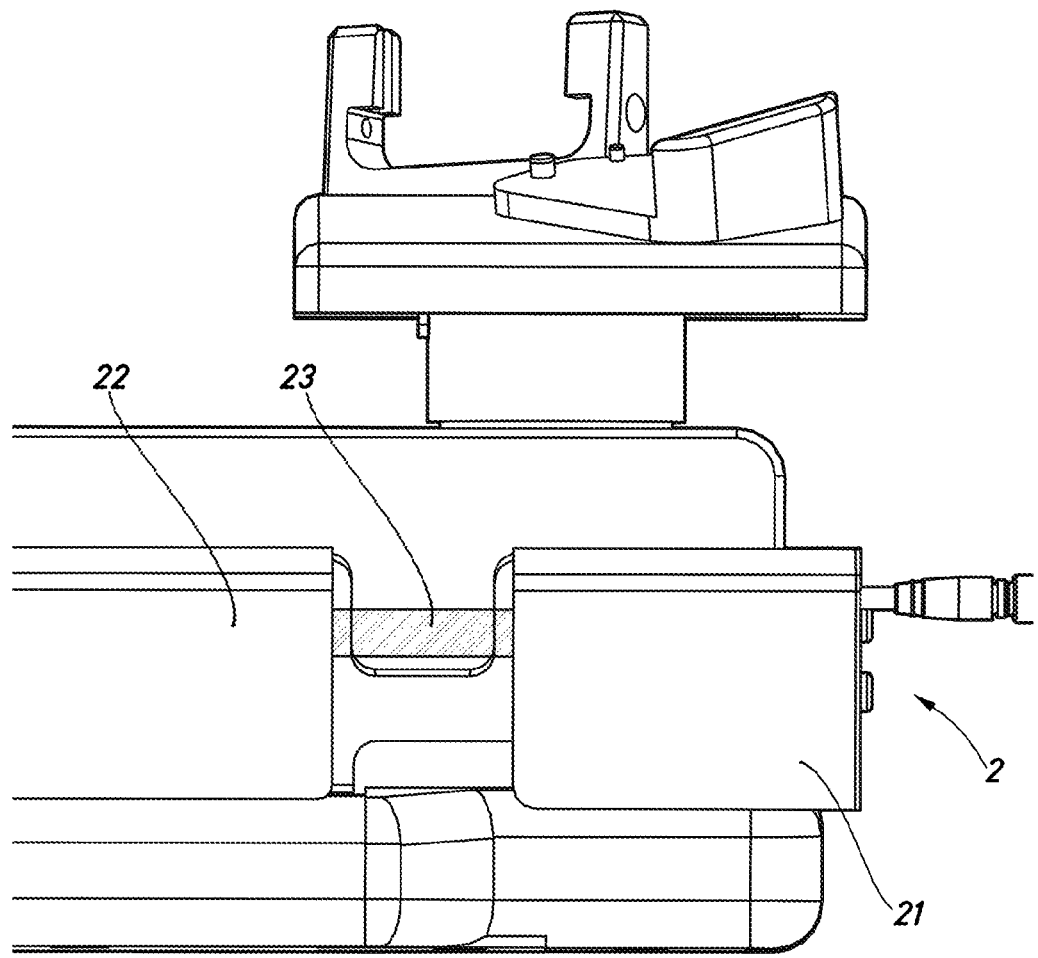
FIG. 3 is an elevation view of the laser position sensor.

Furthermore, the machine comprises a one-dimensional measuring sensor consisting of a laser position sensor -2- (see FIG. 3). The laser sensor -2- comprises an emitter -21- having the function of sending a beam of laser rays to a receiver -22-, such that the laser beam forms a measuring plane -23-. The laser sensor -2- used in the embodiment of the present invention is a multifunction laser CCD (charge-coupled device) micrometer, configured to give the value of the position of the centre of the object placed between the emitter -21- and the receiver -22- in a direction perpendicular to the direction in which the laser beam is transmitted. In other words, the laser sensor -2- supplies a single coordinate in one axis.

Figure 4:
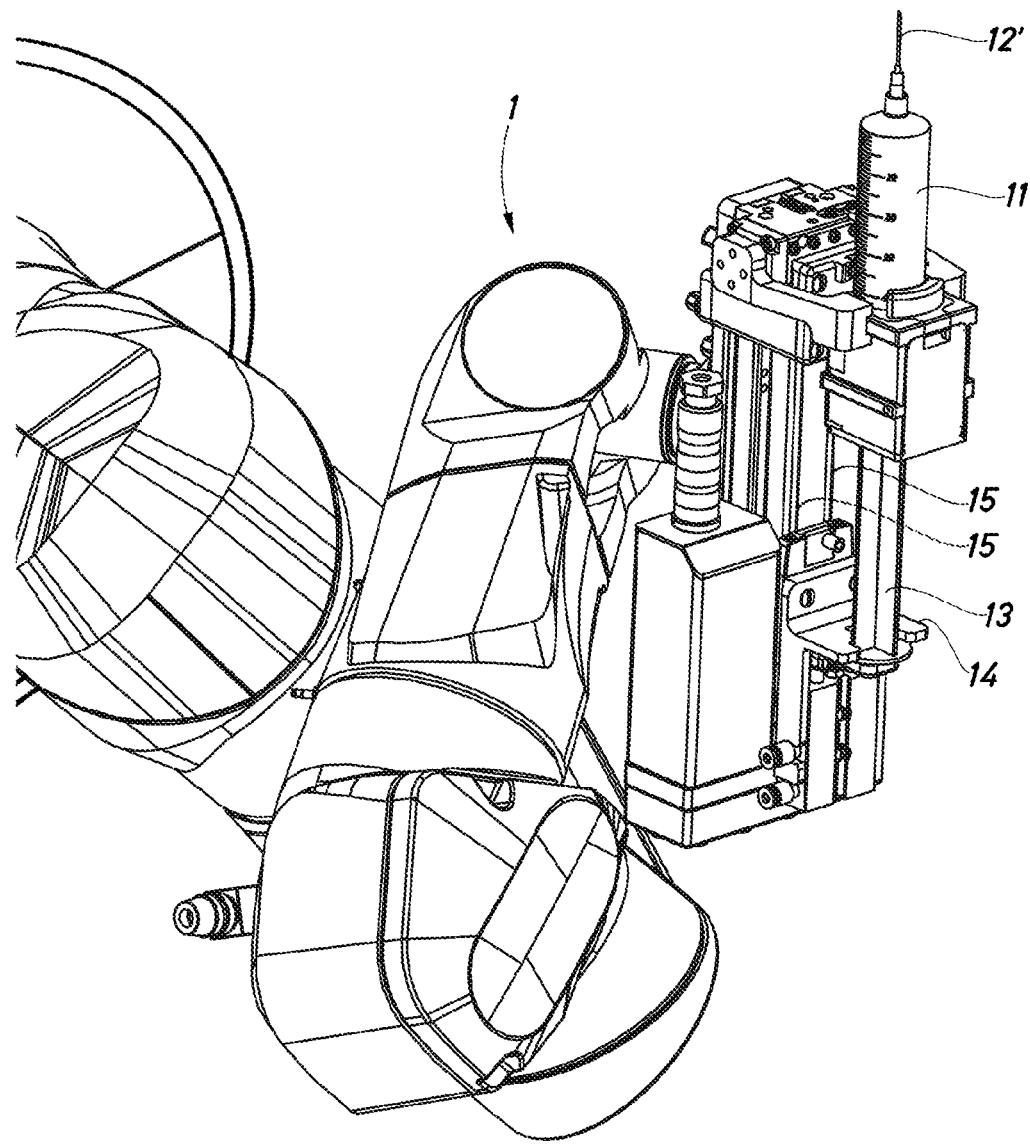
FIG. 4 is a perspective view of the robotic arm supporting a syringe.

FIG. 4 illustrates the actuator of the machine, which in the embodiment shown consists of a robotic arm -1-. At its end, the robotic arm -1- supports a syringe -11- with a reference needle -12'- and a plunger -13-. The plunger -13- of the syringe -11- is actuated by means of an actuator -14- that can slide along guides -15-. The reference needle -12'- corresponds to a needle perfectly aligned with the longitudinal axis of the syringe -11-, i.e. a needle with no deviation. Most needles, however, have a deviation, for example such as that shown by the needle -12- in FIGS. 5 to 10. Specifically, FIGS. 6, 7, 9 and 10 illustrate the deviation of the needle -12- relative to the reference needle -12'-, illustrated by a broken line coinciding with the longitudinal axis of the syringe -11-.

In the present application, the needle -12- relates to a needle that has a deviation, unlike the reference needle -12'-.

The aim is for the robotic arm -1- to calculate the deviation of the needle and correct it by assuming an orientation that causes the needle -12- to enter the hole -31- of the shutter port -3- in the same way that the reference needle -12'- would enter. It can thus be ensured that the needle -12- is inserted accurately into the container -4-, irrespective of its deviation. If the deviation exceeds certain limits, the robotic arm -1- does not make the correction, to avoid colliding with other parts of the machine or with the boundaries of the space in which it operates. In this situation the robotic arm -1- emits a signal to indicate the fact.

Figure 5:
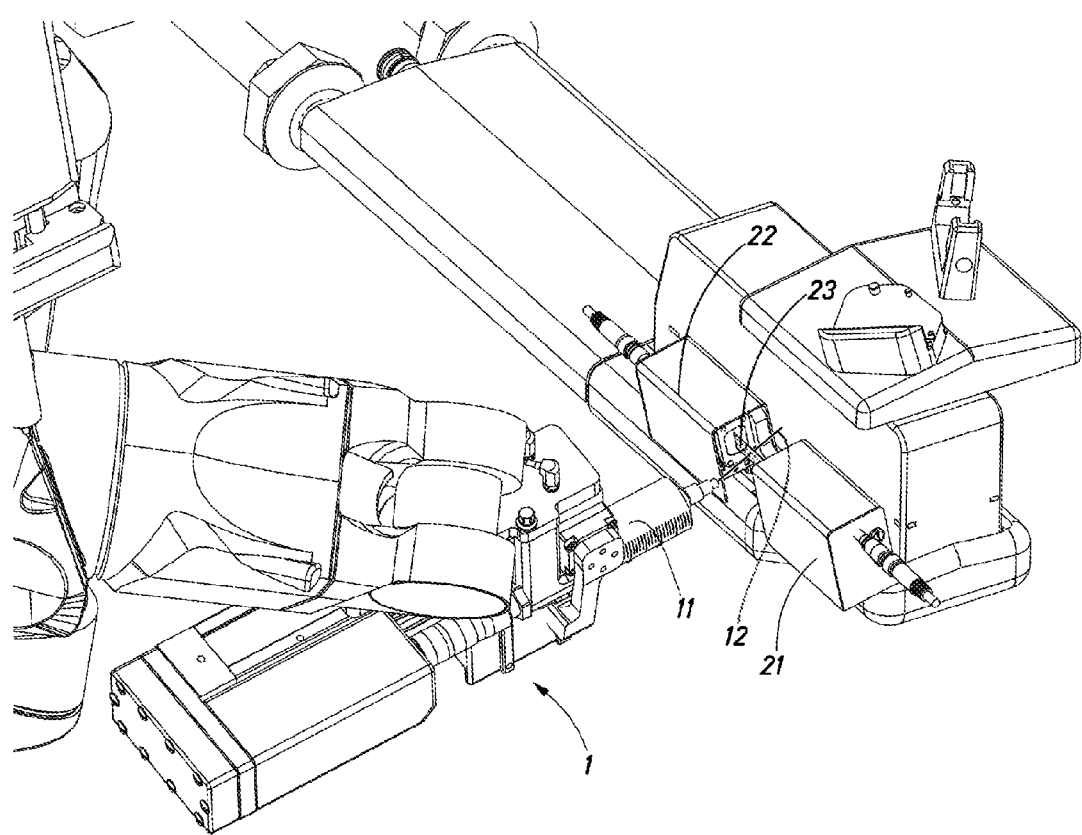
FIGS. 5 and 6 are perspective views of the robotic arm in the first measuring position (P1).
Figure 6:
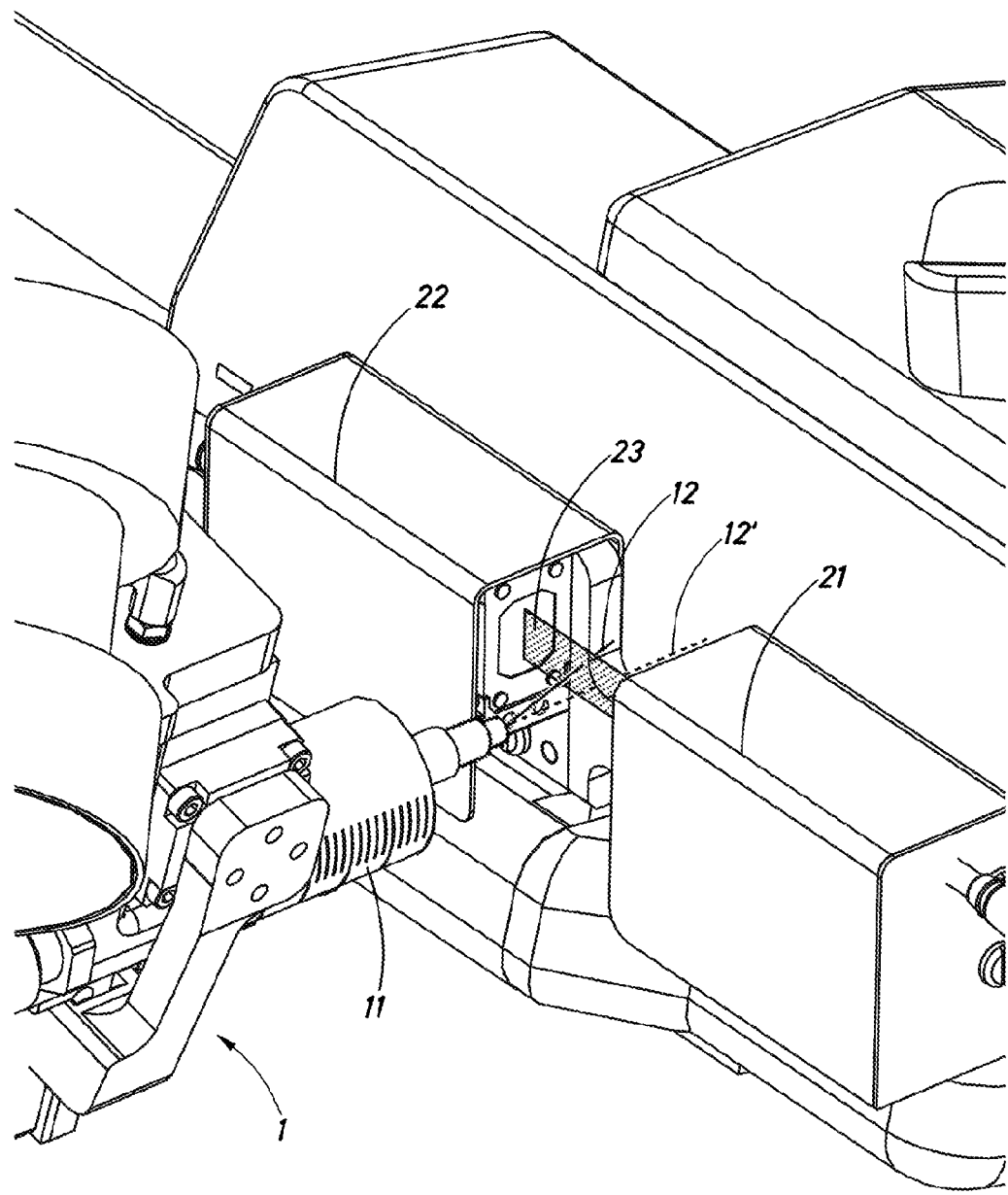

Initially, the syringe -11- having an actual needle -12- is placed on the robotic arm -1-, which is moved into a first measuring position (P1) as shown in FIGS. 5 and 6. In the first position (P1), a first point of the needle -12-, preferably the tip, passes through the measuring plane -23- of the laser sensor -2-, obtaining a first position coordinate of the first point of the needle -12- on a first axis, for example the "x" axis. The control system of the robotic arm -1- stores the "x" coordinate as the variable A1 so that it can subsequently be compared with the "x" coordinate of the reference needle -12'- in that same position (P1), which coordinate is stored as the variable R1 and was obtained during calibration.

Figure 7:
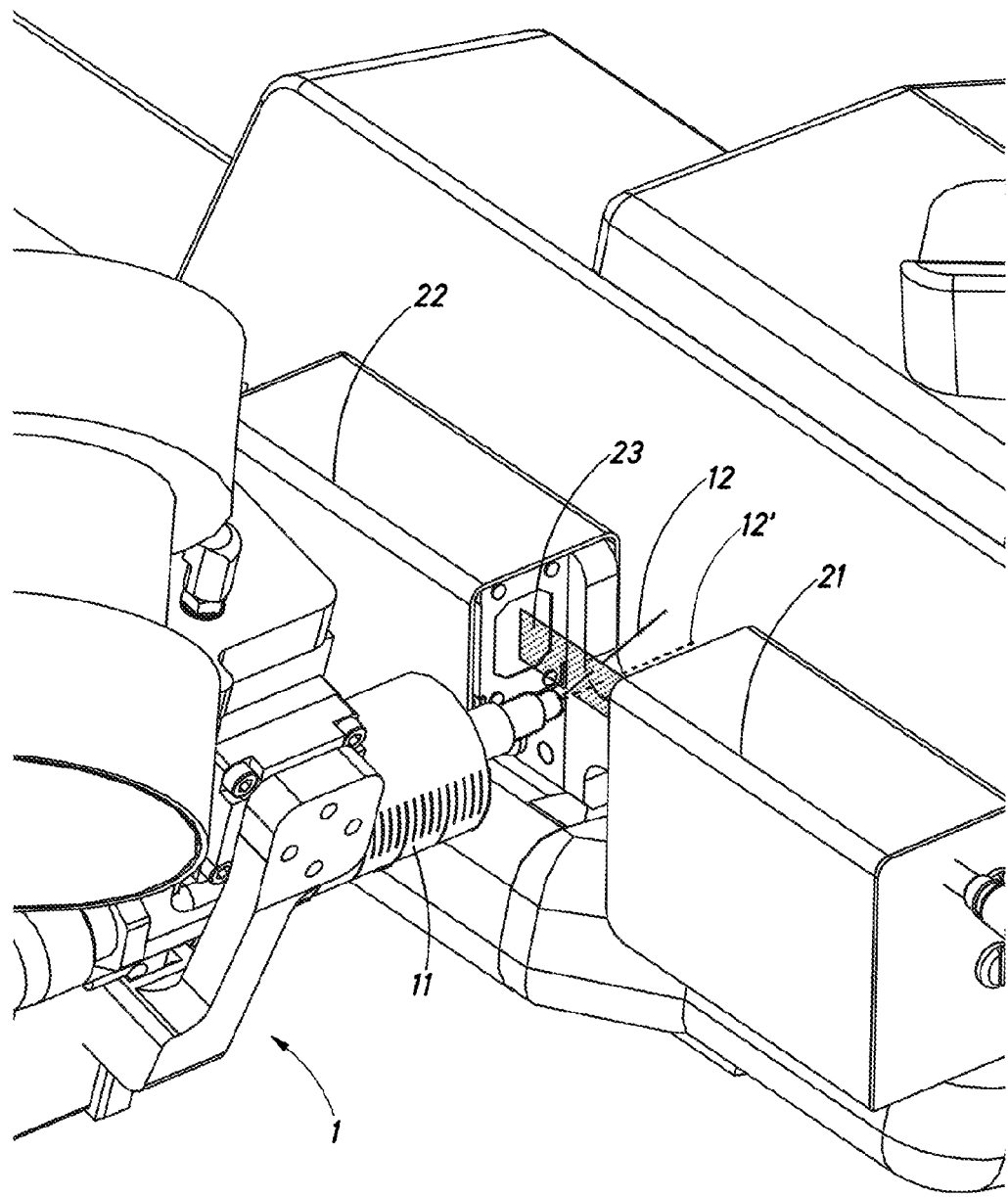
FIG. 7 is a perspective view of the robotic arm in the second measuring position (P1-13).

Next, the robotic arm -1- is moved into a second position (P1-13), shown in FIG. 7. For this, starting from the first position (P1), the robotic arm -1- moves a predetermined distance, preferably 13 mm, by a linear movement in a direction parallel to the longitudinal axis of the syringe -11- and towards the laser sensor -2-. In this second position (P1-13), a second point of the needle -12- passes through the measuring plane -23-. The laser sensor -2- supplies a first position coordinate of the second point of the needle -12- on the same axis as in the first position (P1), namely, the "x" axis. The control system of the robotic arm -1- stores the "x" coordinate as the variable A1-13. The "x" coordinate of the reference needle -12'- in that same position (P1-13) was obtained during calibration and is stored as the variable R1-13.

Figure 8:
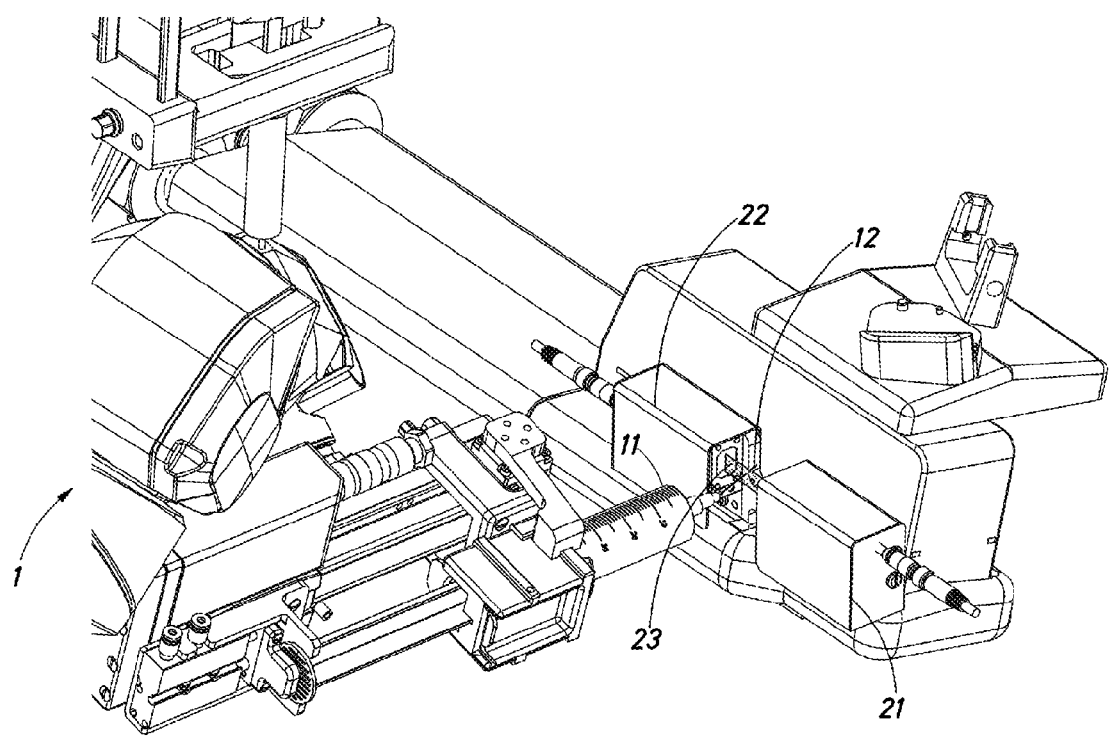
FIG. 8 is a perspective view of the robotic arm in the third measuring position (P2).

Later, the robotic arm -1- is moved into a third position (P2), shown in FIG. 8. In this position the syringe -11- is rotated, preferably clockwise, by 90° relative to the longitudinal axis thereof. The 90° rotation can, however, be made in an anticlockwise direction if the robotic arm -1- has enough room. The result of this 90° rotation is that, even if the laser sensor -2- supplies a single coordinate, the coordinates obtained when measuring in this position (P2) correspond to an axis perpendicular to the "x" axis. The 90° rotation of the robotic arm -1- allows coordinates of the needle to be measured in both axes using a one-dimensional sensor.

In the third position (P2), the first point of the needle -12-, which is preferably the tip, passes through the measuring plane -23- of the laser sensor -2-, obtaining a second position coordinate of the first point of the needle -12- on a second axis, for example the "z" axis. The control system of the robotic arm -1- stores the "z" coordinate as the variable A2. The "z" coordinate of the reference needle -12'- in that same position (P2) was obtained during calibration and is stored as the variable R2.

Lastly, in terms of measurements, the robotic arm -1- moves into a fourth position (P2-13); for this, starting from the third position (P2), the robotic arm -1- moves a predetermined distance, preferably 13 mm, by a linear movement in a direction parallel to the longitudinal axis of the syringe -11- and towards the laser sensor -2-. In this fourth position (P2-13), the second point of the needle -12- passes through the measuring plane -23-. The laser sensor -2- supplies a second position coordinate of the second point of the needle -12- on the same axis as in the third position (P2), namely, the "z" axis. The control system of the robotic arm -1- stores the "z" coordinate as the variable A2-13. The "z" coordinate of the reference needle -12'- in that same position (P2-13) was obtained during calibration and is stored as the variable R2-13.

Once the measurements have been made, the robotic arm -1- moves away from the sensor zone in a straight line, to avoid collisions. The control system of the robotic arm -1- compares the two coordinates of the first point of the needle -12-, stored as the variables A1 and A2, with the corresponding reference coordinates, namely R1 and R2, and determines the position error of the needle -12- relative to the reference needle -12'-.

Furthermore, the control system of the robotic arm -1- compares the two coordinates of the second point of the needle -12-, stored as the variables A1-13 and A2-13, together with the variables A1 and A2, and determines by trigonometry the deviation error of the needle -12- relative to the reference needle -12'-.

Once the errors are determined, the control system of the robotic arm -1- corrects any position errors by displacement in each axis ("x" and "z"), and any deviation errors by rotation about each axis ("x" and "z"). In other words, the position and deviation error of the needle -12- is corrected with no more than two displacements and two rotations, since it is possible for none of the corrections to be necessary.

If the error exceeds a limiting value, the robotic arm -1- does not make the correction and emits a signal to change the needle -12-.

Figure 9:
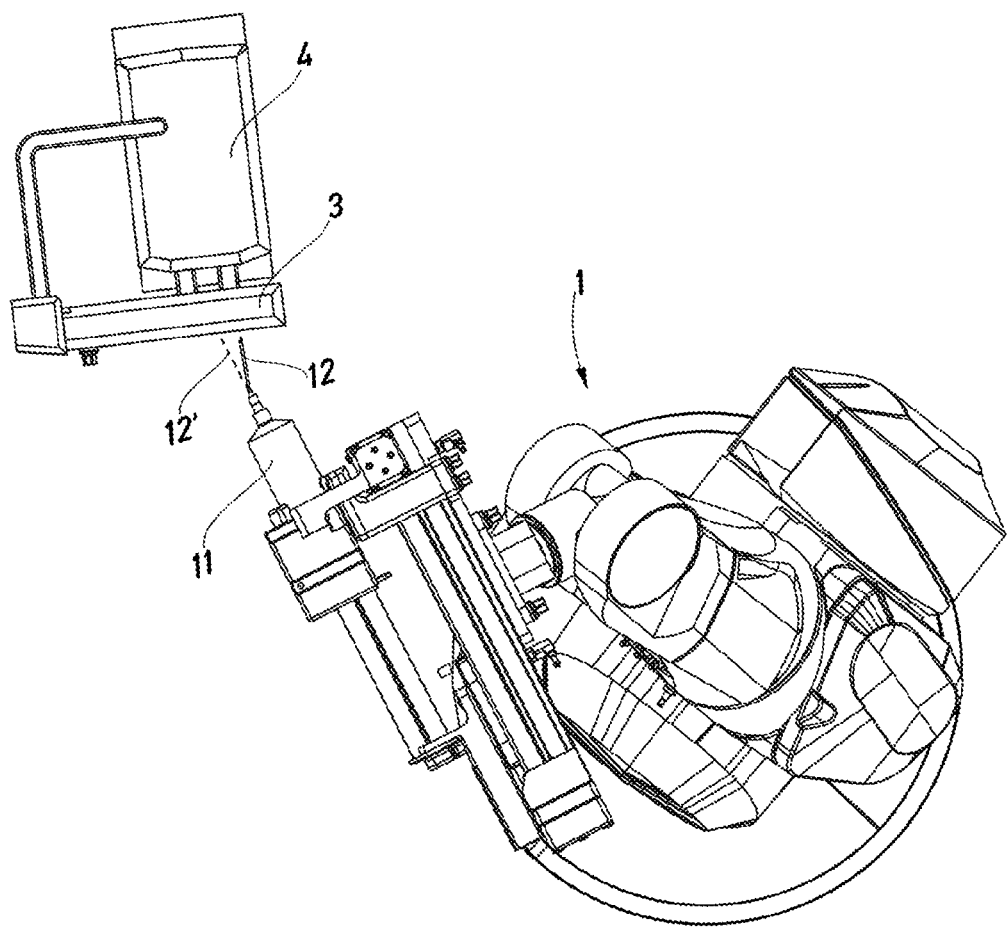
FIG. 9 is a perspective view of the interior of the enclosed space in the machine for automatically preparing medicinal products, illustrating the robotic arm as it approaches the shutter port.
Figure 10:
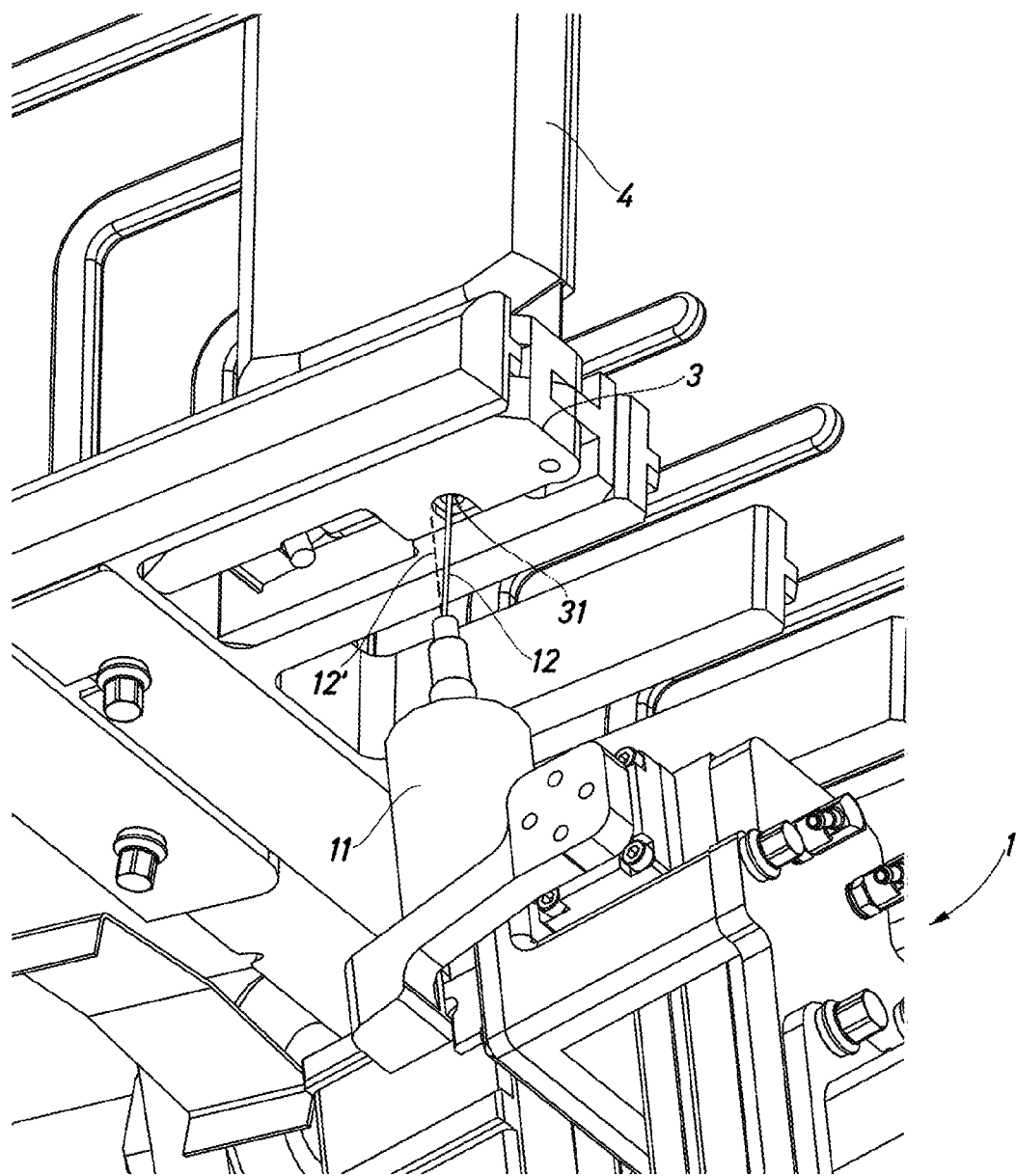
FIG. 10 is a perspective view of the robotic arm at the moment when the needle has been inserted into the shutter port.

After correcting any errors in relation to the reference needle -12'-, as shown in FIGS. 9 and 10, the robotic arm -1- adopts a different position so that the needle -12- enters the shutter port -3- perpendicularly thereto, and can puncture the container -4- correctly, irrespective of its deviation. It can be seen that the needle -12- is perfectly aligned for entering the shutter port -3- even though it has a deviation relative to the reference needle -12'-, illustrated with a broken line coinciding with the longitudinal axis of the syringe -11-.

Errors of deviation and position of the needle -12- relative to the reference needle -12'- can also be corrected immediately after each measurement. In this case, the control system of the robotic arm -1- corrects displacement in the "x" axis after obtaining A1, rotation about the "z" axis after obtaining A1-13, displacement in the "z" axis after obtaining A2 and rotation about the "x" axis after obtaining A2-13. The result is identical if the robotic arm -1- has enough room to move into the measuring positions (P1, P1-13, P2, P2-13). Nonetheless, room for manoeuvre outside the measuring positions is greater and reduces the risk of collision.

Although the invention has been presented and described with reference to embodiments thereof, it should be understood that these do not limit the invention, and so it is possible to vary many details, whether structural or otherwise, that may prove obvious for persons skilled in the art after interpreting the matter disclosed in the present description, claims and drawings. Therefore, all variants and equivalents are included within the scope of the present invention if they can be considered to be comprised within the broadest scope of the following claims.

What is claimed is:

1. A method for correcting the position and deviation of a syringe needle in a machine for automatically preparing intravenous medication, comprising an automatic actuator, together with a control system, in which are placed the syringe and a one-dimensional position sensor comprising a measuring plane, the correction method comprising the following steps:
    positioning the syringe, by the automatic actuator, in a first measuring position in which a first point of the needle interferes with the measuring plane of the position sensor,
    obtaining, by the position sensor, a first position coordinate of the first point of the needle,
    positioning the syringe, by the automatic actuator, in a second measuring position in which a second point of the needle, located a predetermined distance away from the first point, interferes with the measuring plane of the position sensor,
    obtaining, by the position sensor, a first position coordinate of the second point of the needle,
    rotating the syringe, by the automatic actuator, by 90° about the longitudinal axis thereof,
    positioning the 90° rotated syringe, by the automatic actuator, in a third measuring position in which the first point of the needle interferes with the measuring plane of the position sensor,
    obtaining, by the position sensor, a second position coordinate of the first point of the needle,
    positioning the 90° rotated syringe, by the automatic actuator, in a fourth measuring position in which the second point of the needle interferes with the measuring plane of the position sensor,
    obtaining, by the position sensor, a second position coordinate of the second point of the needle,
    moving the position sensor away, by the automatic actuator,
    determining, by the control system of the automatic actuator, the position and deviation error of the needle relative to a reference needle using the position coordinates obtained in the previous phases,
    correcting the position and deviation error of the needle, by the control system of the automatic actuator.

2. The method according to claim 1, wherein the first point of the needle that interferes with the measuring plane is the tip of the needle.

3. The method according to claim 1, wherein the automatic actuator is displaced linearly by a predetermined distance in a direction parallel to the longitudinal axis of the syringe, to move from the first measuring position to the second measuring position.

4. The method according to claim 3, wherein the predetermined distance of linear displacement of the automatic actuator to move from the first measuring position to the second measuring position is 13 mm.

5. The method according to claim 1, wherein the automatic actuator is displaced linearly by a predetermined distance in a direction parallel to the longitudinal axis of the syringe, to move from the third measuring position to the fourth measuring position.

6. The method according to claim 5, wherein the predetermined distance of linear displacement of the automatic actuator to move from the third measuring position to the fourth measuring position is 13 mm.

7. The method according to claim 1, wherein the 90° rotation about the longitudinal axis of the syringe is clockwise.

8. The method according to claim 1, wherein after each step in which the position sensor obtains position coordinates, the following steps are carried out:
    determining, by the control system of the automatic actuator, the position or deviation error of the needle relative to a reference needle using the position coordinates obtained in the previous phases,
    correcting the position or deviation error of the needle, by the control system of the automatic actuator.

9. The method according to claim 1, wherein after the step in which the control system of the automatic actuator determines the position and deviation error of the needle relative to a reference needle, the following steps are carried out:
    comparing the predetermined error with a set limit, by the control system of the automatic actuator,
    in the event that the error exceeds the set limit, omitting the error correction and emitting a signal indicating that fact.

10. The method according to claim 1, wherein the automatic actuator is a robotic arm.

11. The method according to claim 1, wherein the one-dimensional position sensor is a laser position sensor.

* * * * *